United States Patent
Dougherty

(10) Patent No.: US 12,412,940 B1
(45) Date of Patent: Sep. 9, 2025

(54) SYSTEMS AND METHODS FOR METAL RECOVERY FROM LITHIUM ION BATTERIES

(71) Applicant: Aqua Metals Inc., Reno, NV (US)

(72) Inventor: Brian James Dougherty, Emeryville, CA (US)

(73) Assignee: AQUA METALS INC., McCarran, NV (US)

( * ) Notice: Subject to any disclaimer, the term of this patent is extended or adjusted under 35 U.S.C. 154(b) by 759 days.

(21) Appl. No.: 17/584,975

(22) Filed: Jan. 26, 2022

Related U.S. Application Data

(60) Provisional application No. 63/142,409, filed on Jan. 27, 2021.

(51) Int. Cl.
| | |
|---|---|
| *H01M 10/0525* | (2010.01) |
| *C22B 1/00* | (2006.01) |
| *C22B 7/00* | (2006.01) |
| *C22B 26/12* | (2006.01) |
| *H01M 10/54* | (2006.01) |

(52) U.S. Cl.
CPC .............. *H01M 10/54* (2013.01); *C22B 1/005* (2013.01); *C22B 7/007* (2013.01); *C22B 26/12* (2013.01); *H01M 10/0525* (2013.01)

(58) Field of Classification Search
CPC ......... C22B 1/005; C22B 26/12; C22B 7/007; H01M 10/0525; H01M 10/54
See application file for complete search history.

(56) References Cited

U.S. PATENT DOCUMENTS

| | | | |
|---|---|---|---|
| 8,404,138 B2 | 3/2013 | Arimura et al. | |
| 9,487,845 B2 | 11/2016 | Heidenfelder et al. | |
| 2012/0312126 A1 | 12/2012 | Yamaguchi et al. | |
| 2013/0206607 A1* | 8/2013 | Kojima | H01M 10/54 |
| | | | 205/589 |
| 2013/0287654 A1* | 10/2013 | Yamada | H01M 10/052 |
| | | | 252/186.1 |
| 2018/0309174 A1 | 10/2018 | Rodriguez et al. | |
| 2022/0013820 A1* | 1/2022 | Rohde | C22B 23/0461 |

FOREIGN PATENT DOCUMENTS

| | | | | |
|---|---|---|---|---|
| EP | 3364494 A1 | | 8/2018 | |
| JP | 3675392 B2 | * | 7/2005 | ............. C22B 26/12 |
| TW | I726033 B | * | 1/2017 | |
| WO | 2019121086 A1 | | 6/2019 | |
| WO | 2019197192 A1 | | 10/2019 | |
| WO | 2020011765 A1 | | 1/2020 | |
| WO | 2020109045 A1 | | 6/2020 | |
| WO | 2020126855 A1 | | 6/2020 | |

OTHER PUBLICATIONS

Strauss et al, Separation of cobalt, nickel, and manganese in leach solutions of waste lithium-ion batteries using Dowex M4195 ion exchange resin, Hydrometallurgy, vol. 206, 2021, 105757, ISSN 0304-386X, (Year: 2021).*
Galizia et al, Monovalent and divalent ion sorption in a cation exchange membrane based on cross-linked poly (p-styrene sulfonate-co-divinylbenzene), Journal of Membrane Science, vol. 535, 2017, pp. 132-142, ISSN 0376-7388 (Year: 2017).*
Fu et al, Removing miscellaneous heavy metals by all-in-one ion exchange-nanofiltration membrane, Water Research, vol. 222, 2022, 118888, ISSN 0043-1354, (Year: 2022).*
Translation JP-2001/3675392.*
Translation TW-2017/1726033.*
Aaltonen et al., "Leaching of Metals from Spent Lithium-Ion Batteries," Recycling, 2017; 2(20); 9 pgs.
Pasquali et al., "Electrolytic cobalt recovery from lithium-ion batteries," Waste Processing and Recycling in Mineral and Metallurgical Industries IV; Proceedings of the Fourth International Symposium on Waste Processing and Recycling in Mineral and Metallurgical Industries, Aug. 26-29, 2001, Toronto, Ontario, Canada; 14 pgs.
Quintero-Almanza et al., "Recovery of Cobalt from Spent Lithium-Ion Mobile Phone Batteries Using Liquid-Liquid Extraction," Batteries, 2019; 5(44); 13 pgs.
Velazquez-Martinez et al., "A Critical Review of Lithium-Ion Battery Recycling Processes from a Circular Economy Perspective," Batteries, 2019; 5(68); 33 pgs.
Wang et al., "Recycling LiCoO2 with methanesulfonic acid for regeneration of lithium-ion battery electrode materials," Journal of Power Sources, 2019; 436; 9 pgs.
Zheng et al., "A Mini-Review on Metal Recycling from Spent Lithium Ion Batteries," Engineering, 2018; 4:361-370.

* cited by examiner

*Primary Examiner* — Muhammad S Siddiquee
(74) *Attorney, Agent, or Firm* — Umberg Zipser LLP

(57) ABSTRACT

Systems and methods for recovery of lithium and various non-lithium components from lithium ion battery waste materials are presented in which all components are first leached into a leach solution. Non-lithium components are adsorbed to an ion exchange resin, and unbound lithium passes through and precipitated from the pass through fraction. The bound non-lithium components are then sequentially desorbed and preferably electrolytically recovered as metals.

20 Claims, 2 Drawing Sheets

SYSTEMS AND METHODS FOR METAL RECOVERY FROM LITHIUM ION BATTERIES

This application claims priority to our U.S. Provisional Patent application with the Ser. No. 63/142,409, which was filed Jan. 27, 2021, and which is incorporated by reference herein.

FIELD OF THE INVENTION

The field of the invention is systems and methods for recovery of metals from lithium containing batteries, and particularly recovery of cobalt, nickel, and/or manganese from used lithium ion batteries in addition to recovery of lithium.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The production and usage of lithium ion batteries has worldwide dramatically increased over the last decade, placing a significant strain on supply for the raw materials needed for the manufacture of such batteries. Moreover, for at least the next twenty years a further increase in demand is projected. Unfortunately, the raw material sourcing and processing is almost exclusively based on foreign (non-US) countries, exposing the US economy to significant supply and price vulnerability.

While lead acid battery recycling has become an integral part of re-supplying lead for production of new lead acid batteries, recycling of lithium ion batteries is significantly less well developed. Among other factors, there is a relatively large diversity of form factors (such as battery packs, modules, cylindrical cells, prismatic cells, pouch cells, etc.), available materials (such as defect and intermediate waste cells, metal scraps, slurries, and powders), and cathode chemistries (such as lithiated cobalt oxide, lithiated nickel-cobalt-aluminum oxide, lithiated nickel-cobalt-manganese oxide, lithiated nickel-cobalt-manganese-aluminum oxide, lithiated nickel-oxide, and lithiated manganese-oxide, etc.). Moreover, the relative amounts of transition metals used in lithium-based batteries vary substantially among different lithium ion batteries, which typically compounds recovery of lithium and other valuable metals from lithium ion batteries. In addition, similar supply challenges exist for these valuable metals such as nickel, cobalt, and manganese, and many lithium recovery processes entirely fail to address recycling of these elements. An overview of currently known lithium ion battery processes is found elsewhere (see *Batteries* 2019, 5, 68; doi:10.3390/batteries5040068).

Thus, even though various systems and methods of recycling lithium ion batteries are known in the art, all or almost all of them suffer from several drawbacks. Therefore, there remains a need for compositions and methods for improved metal recovery from lithium ion batteries.

SUMMARY OF THE INVENTION

The inventive subject matter is directed to various systems and methods of metal recovery from disused lithium ion batteries, and especially from black mass of lithium ion batteries. Advantageously, the methods contemplated herein are able to recover not only lithium but also additional metals of commercial value in a conceptually simple and effective manner.

In one aspect of the inventive subject matter, the inventor contemplates a method of recycling lithium and non-lithium components from a waste material that includes a step of providing a feed material comprising lithium and a plurality of distinct non-lithium components. In a further step, the lithium and the distinct non-lithium components are leached from the feed material with a leach solution to form a leachate, and at least some of the non-lithium components are removed from the leachate to form a non-lithium component enriched particulate phase and a lithium enriched solution. In another step, a lithium product is separated from the lithium enriched solution, thereby producing a non-lithium product, and in still another step, a first non-lithium component is sequentially removed from a distinct second non-lithium component.

In preferred aspects, the feed material comprises black mass from lithium ion batteries, and/or the distinct non-lithium components may therefore comprise at least two of nickel, cobalt, and manganese. In typical embodiments, the leach solution is an acid and may optionally comprise a chelator. For example, suitable leach solutions may include sulfuric acid, methanesulfonic acid, EDTA, hydrochloric acid, or any reasonable combination thereof (e.g., methanesulfonic acid and EDTA).

In further embodiments, the step of removing at least some of the non-lithium components from the leachate uses filtration to so form the non-lithium component enriched particulate phase (typically including carbonaceous materials such as graphite, graphene, carbon nanotubes, etc.). Preferably, but not necessarily, the step of separating may include a step of removing at least some of the non-lithium components by adsorption of the non-lithium components onto an ion exchange material while allowing the lithium product to pass through the ion exchange material as a pass through fraction. Most typically, the pass through fraction is then subjected to a step of precipitation of the lithium in the pass through fraction. Advantageously, the precipitation of the lithium will so regenerate at least some of the leach solution.

It is still further contemplated that the step of sequentially removing the first non-lithium component and the distinct second non-lithium component may be performed by selective elution of the first non-lithium component and the second non-lithium component from the same ion exchange material. Alternatively, the step of sequentially removing the first non-lithium component and the distinct second non-lithium component may also include a step of separate elution of the first non-lithium component and the second non-lithium component from respective separate ion exchange materials.

Most typically, but not necessarily, the first non-lithium component and the second non-lithium component are reduced to metallic non-lithium components in an electrolyzer. In some examples, the first non-lithium component and the second non-lithium component may be reduced together to form a mixed metallic non-lithium component in the same electrolyzer. In further examples, the first non-lithium component may be manganese and may be recovered as electrolytic manganese dioxide (EMD) or electrolytic manganese metal (EMM). Alternatively, or additionally, the first non-lithium component may be nickel and the second non-lithium component may be cobalt and are recovered as metallic nickel and metallic cobalt. Preferably, electrolytic recovery of the first and/or second non-lithium component will produce a recycled eluent for the ion exchange material(s).

In addition, it is contemplated that the methods presented herein may also (after recovering the lithium product from the lithium enriched solution) include a step of reconditioning the solution to regenerate at least some of the leach solution. Moreover, contemplated methods may further include a step of drying the feed material prior to the step of leaching.

Various objects, features, aspects, and advantages of the inventive subject matter will become more apparent from the following detailed description of preferred embodiments, along with the accompanying drawing figures in which like numerals represent like components.

DETAILED DESCRIPTION

The inventor has now discovered various systems and methods for recovery of lithium and other valuable metals such as cobalt, nickel, and manganese that enable effective recycling of waste materials from lithium ion batteries. Indeed, using contemplated systems and methods, the metals are first leached from the feed materials, typically black mass, to form a leachate that is then preferably subjected to ion exchange adsorption to selectively bind the non-lithium components and to produce a lithium enriched (relative to other components) pass through solution. Lithium is then recovered from the lithium enriched pass through solution to so regenerate the leach solution, while the non-lithium components are selectively eluted from the ion exchange material(s). The so produced eluents can then be subjected to electrolytic recovery of the non-lithium components, preferably to thereby regenerate the respective eluents.

Of course, it should be appreciated that while black mass from disused lithium ion batteries is especially preferred as a feed material, it is also contemplated that lithium containing waste materials from other lithium recovery processes are also deemed suitable for use herein. Likewise, other waste materials (typically from lithium ion battery recycling processes) comprising lithium, nickel, cobalt, and/or manganese are also deemed suitable and may include residual materials from high-temperature processes or precipitation-based metal recovery operations. It should also be appreciated that the systems and methods presented herein need not necessarily be limited to ion exchange materials, but may also use solvent-based extractions, and especially solvent based extraction of one or more of lithium, nickel, cobalt, and manganese.

In this context, it should be noted that reference to any (transition)metals noted herein is meant to include ionic forms of these metals in all possible valence states, as well as oxides, hydroxides, etc. In contrast, where the metal is in non-ionic elemental form, the metal is then referred to as metallic or metal (e.g., metallic cobalt or cobalt metal or cobalt in metallic form, or elemental cobalt).

Figure 1:
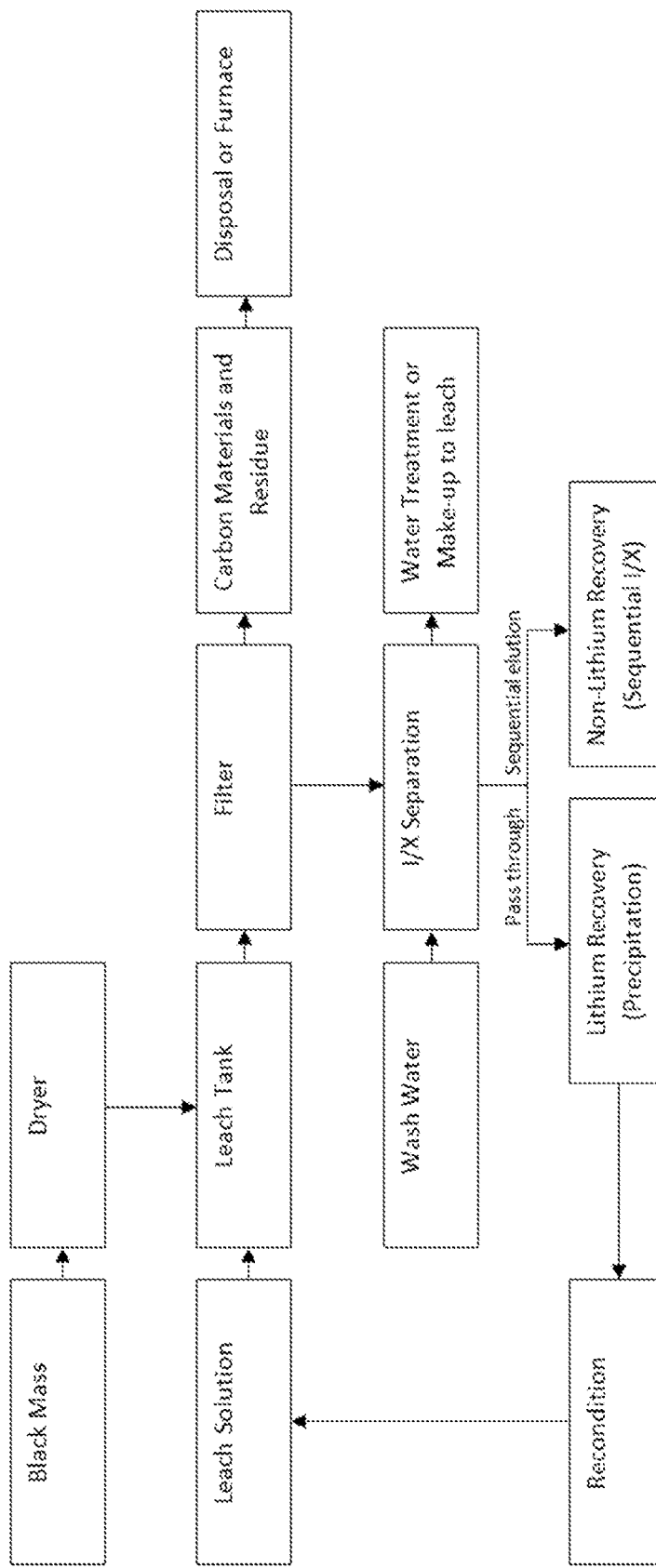
FIG. 1 is an exemplary flow chart for lithium ion recovery according to the inventive subject matter.

In one exemplary embodiment as schematically depicted in FIG. 1, a recycling process for lithium and non-lithium components from lithium battery waste material begins with acquisition or generation of lithium ion battery electrode active material (e.g., "black mass"), which is typically separated from the remainder of a battery (e.g., plastic components) by any suitable method, including density separation, sieving, etc. to so produce a feed material. The so obtained feed material is dried to remove any residual water from the separation, cleaning, or other process.

As should be readily appreciated, there are numerous lithium battery waste materials suitable for use herein, and the particular type of waste material will be determined by the type of lithium battery and particular chemistry employed. Therefore, contemplated lithium battery waste materials include lithium ion batteries, lithium polymer batteries, lithium sulfur batteries, lithium iron phosphate batteries, etc. Viewed from a different perspective, lithium battery chemistries suitable for use herein may include various cathode materials such as lithium iron phosphate, lithium cobalt oxide, lithium manganese oxide, lithium nickel manganese cobalt oxide, lithium nickel cobalt aluminum oxide, and lithium titanate. Moreover, a variety of lithium batteries also include carbonaceous materials for the construction of anode materials, and the carbon may be in form of various allotropes such as carbon nanotubes, graphene, or (pyrolytic or exfoliated) graphite, etc.

Unless already comminuted, it is generally preferred that the black mass or other lithium battery waste material will be processed to a relatively small form factor such as to enable more efficient leaching. For example, suitable materials will typically be comminuted or granulated to particles having an average size (as measured in the largest dimension) of no more than 25 mm, or no more than 10 mm, or no more than 8 mm, or no more than 5 mm, or no more than 2.5 mm, or no more than 1 mm, or no more than 0.5 mm, or no more than 0.25 mm, or no more than 0.1 mm, and even less. Therefore, suitable sizes for waste materials in contemplated processes will be between 0.01 mm and 0.1 mm, or between 0.05 mm and 0.25 mm, or between 0.1 mm and 0.5 mm, or between 0.5 mm and 2.5 mm, or between 1 mm and 5 mm, or between 5 mm and 15 mm, or between 10 mm and 50 mm.

Drying of the waste material (preferably in comminuted form) can be performed to a residual water content of no more than 5 wt %, or no more than 2.5 wt %, or no more than 1 wt %, or no more than 0.5 wt %, and even less. It should further be appreciated that the waste material can also be heat treated at temperatures of between about 25-65° C., or between about 50-100° C., or between about 100-200° C., or between about 200-350° C., or even higher, typically for at least 30 minutes, or at least 60 minutes, or at least 120 minutes, or at least 240 minutes, or even longer.

Most typically, the comminuted and dried material will then be transferred to a leaching tank where it is intimately mixed with a leach solution. In most instances, the leach solution will be an aqueous acid that may further include a chelator, or an aqueous solution (typically at acidic pH) that may include a chelator. While not limiting to the inventive subject matter, preferred leach solutions include sulfuric acid, methanesulfonic acid, sulfamic acid, hydrochloric acid, etc. or combination thereof, which may further include EDTA as a chelator.

Sulfuric acid, methanesulfonic, and disodium EDTA are preferred components in a leach solution. Where acids other than sulfuric acid or methanesulfonic acid and possibly EDTA are used as the leach solution, an additional reducing agent might be needed (which may also be present in the sulfuric acid or methanesulfonic containing leach solutions).

Most typically, the acid will be present in the aqueous solution in an amount sufficient to allow for effective leaching and to provide a counter ion to the leached cationic metal species to be leached. Therefore, and depending on the particular type of acid, typical acid concentrations in the leach solution will be at least 5 wt %, or at least 10 wt %, or at least 15 wt %, or at least 20 wt %, or at least 25 wt %, or at least 30 wt %, or at least 35 wt %, or at least 40 wt %, or at least 45 wt %, and even higher. Consequently, the leach solution may include acids in an amount of between 5-15 wt %, or between 5-15 wt %, or between 10-25 wt %, or between 20-55 wt %, or between 25-50 wt %.

In further preferred aspects, the leach solution will have an acid pH, typically less than pH 6.0, or less than pH 5.0, or less than pH 4.0, or less than pH 3.0, or less than pH 3.0. Viewed from a different perspective, the leach solution may have a pH range of between 2-4, or 3-5, or 4-6, or 2-5, or 3-6, or 2-6. Thus, the resulting leach solution will be concentrated in metal ions, preferably at a pH 2-6. To accelerate leaching and/or efficiency, leaching may be performed at elevated temperatures such as 30° C. or higher, or 40° C. or higher, or 50° C. or higher, or 60° C. or higher. For example, leaching temperatures may be in the range of 30-60° C., or in the range of 40-70° C., or in the range of 20-50° C., or in the range of 25-70° C. Lech times and temperatures can be optimized by determination of the metal ion concentration using methods well known in the art. Moreover, it should be appreciated that the leaching mixture may be agitated (with or without recirculation of leach solution) during leaching.

With respect to suitable solid-to-liquid ratios for the step of leaching it is preferred that the leaching mixture will have sufficient quantities of leach solution to extract at least 70%, or at least 80%, or at least 85%, or at least 90, or at least 95% of one or more ionic metals (i.e., one or more of lithium, cobalt, nickel and/or manganese) from the comminuted materials. Therefore, the leaching mixture will include more leach solution by weight than comminuted materials. For example, suitable solid-to-liquid ratios include 1:1.2, or 1:1.5, or 1:2 or 1:2.5 or 1:3 or 1:4 or 1:5, and even higher. Of course, it should also be noted that significantly higher quantities of leach solutions relative to waste materials may be used where a surge or storage tank for the leachate is implemented.

In still further preferred aspects of contemplated methods, the slurry from the leaching tank is filtered to remove particulates and so form a leachate. For example, typical particulates will include non-dissolved residue (mostly one or more carbon allotropes, perhaps some metal ions that were not leached) and are typically treated as a waste stream that may be properly disposed of or incinerated.

After removal of particulates, the leachate then passes to a separation system, preferably an ion-exchange system where the divalent metal ions are captured on the resin. As will be readily appreciated, ion exchange resins may be selective for a specific metal ion (e.g., selectively bind cobalt) or may bind at least two or three different metal ions (e.g., two or three of cobalt, nickel, manganese). For example, suitable resins include the Du Pont™ Ambersep™ 4195, a chelating resin designed for scavenging metals in mining applications with high selectivity for copper, or the Purolite™ Puromet™ MTX8010, a macroporous polystyrene crosslinked with divinylbenzene, or any other commercially available equivalent resin. Elution of the bound ions may then be performed in a sequential manner using suitable elution solvents. In other or additional examples, removing at least some of the non-lithium components from the leachate could be sequentially performed in a series of ion exchange columns with different resins having selectivity for a specified metal ion. For example, Ni, Co, Zn, Fe, Cu and Al will all be absorbed by Ambersep™ 4195 (manganese and lithium may not be adsorbed and as such require a second, different resin). In still further alternative processes, the lithium and one or more non-lithium components could also be isolated as separate product streams using a solvent extraction. The ion exchange resin(s) will typically be subject to a wash step, and the wash water can be recycled to the leach circuit (e.g., as make up water). Otherwise, the wash water becomes a waste stream that will typically be processed in a water treatment plant.

After passage through the ion exchange column(s), the pass through fraction is lithium rich (relative to other non-lithium components), and the lithium will be removed from the pass through fraction such as to recycle the leach solution back to the leach circuit. Depending on the pH of this stream, lithium could be precipitated via carbonation, either by $CO_2$ or $Na_2CO_3$, which would result in precipitation of $Li_2CO_3$. Most preferably, but not necessarily, this may be performed at elevated temperatures, such as up to 90-95° C., to maximize recovery of $Li_2CO_3$. Alternatively, and especially where the solution is acidic, a salt-splitting cell may be employed to recover the lithium once it has built up to sufficient quantities. In this context, it should be appreciated that if the leach solution is to be reused, one would in at least some instances need to recondition the solution to recover the acid (e.g., where the leach solution comprises MSA or $Na_2EDTA$). For example, if a $H_2SO_4$ solution is used as leach solution, and $Na_2CO_3$ to precipitate $Li_2CO_3$, then the $Na_2SO_4$ could go to a salt-splitting cell to recover $H_2SO_4$ on one side and NaOH on the other. The NaOH could be carbonated to regenerate $Na_2CO_3$. Alternatively, the $Na_2SO_4$ could be treated, evaporated, and disposed of.

In certain embodiments, the non-lithium metals are preferably selectively and sequentially stripped from the ion exchange resin. For example, for the Ambersep™ 4195 resin, cobalt can be removed by e.g., 20 g/l $H_2SO_4$ or about 35-40 g/l MSA solution (which has the same acid strength). Nickel can be removed at 50 g/l $H_2SO_4$ or 90-100 g/l MSA. Copper can be removed by ammonium hydroxide, for example. It should, of course, be appreciated that suitable testing can be performed to determine the optimum sequence of steps and/or whether or not more than one ion exchange resin is needed. In further contemplated aspects, aluminum, and to a lesser extent iron can be extracted by weak sulfuric acid solutions (<10 g/l). Cobalt requires higher acid concentration, but some Nickel will be removed with it. Nickel can be removed at still higher acid concentrations. But it might also be more advantageous to strip the nickel and copper together and subsequently to separate nickel from copper.

Figure 2:
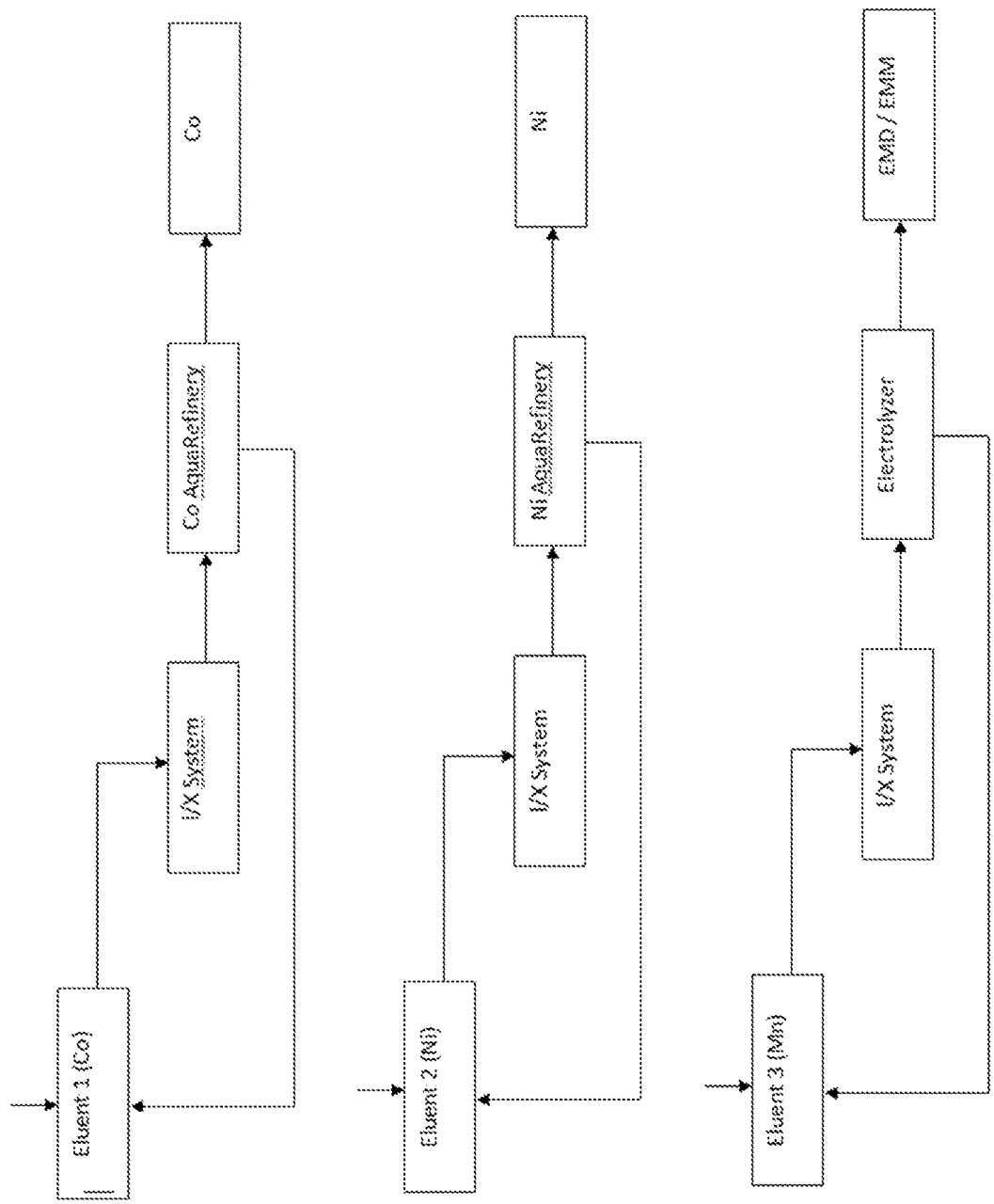
FIG. 2 is an exemplary flow chart for cobalt, nickel, and manganese recovery according to the inventive subject matter.

As is exemplarily shown in FIG. 2, each of the individual eluents from the ion exchange resins (or individual sequentially eluted eluents) are then treated in separate electrolyzers to recover the metals separately. Among other suitable electrolyzers, preferred electrolyzers will have a cathode that moves relative to the electrolyte to enable reduction of a portion the cathode that is immersed in the electrolyte and removal of the metallic element from the same cathode on a portion that is not immersed in the electrolyte (see e.g., U.S. Pat. No. 9,837,689). Where desired, it should be appreciated that cobalt and nickel can be plated together on the same electrode. Moreover, it should be noted that Manganese could be recovered as electrolytic manganese dioxide (EMD) or as electrolytic manganese metal (EMM). As is also shown in FIG. 2, the separate eluates from a single ion exchange resin that binds all divalent cations can also be further refined by passing the eluate stream through a further metal ion selective resin as is shown for eluent 1, 2, and 3 that are passed through copper, nickel, and manganese selective resins, respectively. However, the additional metal ion selective ion exchange resin can also be omitted. Where present, it should be noted that the depleted electrolyte after elemental metal recovery (or EMD/EMM recovery) can be used in the ion exchange process as is also shown in FIG. 2.

In still further contemplated aspects, rather than just making briquettes and refining the so obtained metals, one could take the plated metals back to the oxide form in a process similar to lead oxide formation from electrolytically obtained lead (e.g., using a ball mill process or Barton pot-type oxidizer). Alternatively, in less preferred aspects, the metals can also be precipitated as metal oxides form the eluent.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of recycling lithium and non-lithium components from a waste material, comprising:
   providing a feed material comprising lithium and a plurality of distinct non-lithium components;
   leaching the lithium and the distinct non-lithium components from the feed material with a leach solution to form a leachate;
   removing at least some of the non-lithium components from the leachate to form a non-lithium component enriched particulate phase and a lithium enriched solution;
   separating from the lithium enriched solution a lithium product, thereby producing a non-lithium product;
   wherein separating comprises removing at least some of the non-lithium components by adsorption of the non-lithium components onto an ion exchange resin while allowing the lithium product to pass through the ion exchange resin as a pass through fraction;
   sequentially removing from the non-lithium product a first non-lithium component from a distinct second non-lithium component; and
   reducing the first non-lithium component and the second non-lithium component into metallic non-lithium components in one or more electrolyzers.

2. The method of claim 1, wherein the feed material comprises black mass from lithium ion batteries.

3. The method of claim 1, wherein the distinct non-lithium components comprise at least two of nickel, cobalt, and manganese.

4. The method of claim 1, wherein the leach solution is an acid and optionally comprises a chelator.

5. The method of claim 1, wherein the leach solution comprises sulfuric acid, methanesulfonic acid, EDTA, hydrochloric acid, or a combination thereof.

6. The method of claim 1, wherein the leach solution comprises methanesulfonic acid and/or EDTA.

7. The method of claim 1, wherein the step of removing at least some of the non-lithium components from the leachate comprises filtering the leachate to form the non-lithium component enriched particulate phase.

8. The method of claim 7 wherein the non-lithium component enriched particulate phase includes carbonaceous materials.

9. The method of claim 1, wherein the step of separating further comprises multiple distinct ion exchange resins, wherein each ion exchange resin has selectivity for a distinct metal ion.

10. The method of claim 9, further comprising a step of subjecting the pass through fraction to a step of precipitation of the lithium in the pass through fraction.

11. The method of claim 10, wherein the precipitation of the lithium regenerates at least some of the leach solution.

12. The method of claim 1, wherein the sequentially removing the first non-lithium component and the distinct second non-lithium component comprises selective elution of the first non-lithium component and the second non-lithium component from the same ion exchange material.

13. The method of claim 1, wherein the sequentially removing the first non-lithium component and the distinct second non-lithium component comprises separate elution of the first non-lithium component and the second non-lithium component from respective separate ion exchange materials.

14. The method of claim 1, wherein the step of reducing further comprises at least two electrolyzers, wherein each electrolyzer is configured to reduce a distinct metal ion.

15. The method of claim 1, wherein the first non-lithium component and the second non-lithium component are reduced together to a mixed metallic non-lithium component in the same electrolyzer.

16. The method of claim 1, wherein the first non-lithium component is manganese and is recovered as electrolytic manganese dioxide (EMD) or electrolytic manganese metal (EMM).

17. The method of claim 1, wherein the first non-lithium component is nickel and the second non-lithium component is cobalt, and wherein the first and second non-lithium components are recovered as metallic nickel and metallic cobalt, respectively.

18. The method of claim 14, wherein electrolytic recovery of the first and/or second non-lithium component produces recycled eluent for the ion exchange materials.

19. The method of claim 1, further comprising after recovering the lithium product from the lithium enriched solution, a step of reconditioning the solution to regenerate at least some of the leach solution.

20. The method of claim 1, further comprising a step of drying the feed material prior to the step of leaching.

* * * * *